(12) United States Patent
Rudkin

(10) Patent No.: US 7,258,014 B2
(45) Date of Patent: Aug. 21, 2007

(54) DEVICE FOR MEASURING PRESSURE

(75) Inventor: Mark J. Rudkin, Farnborough (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 0 days.

(21) Appl. No.: 11/132,441

(22) Filed: May 19, 2005

(65) Prior Publication Data

US 2005/0268721 A1 Dec. 8, 2005

(51) Int. Cl.
*G01L 11/00* (2006.01)
(52) U.S. Cl. ........................................ 73/702
(58) Field of Classification Search ............... 73/702
See application file for complete search history.

(56) References Cited

U.S. PATENT DOCUMENTS

| | | | |
|---|---|---|---|
| 3,021,711 A | 2/1962 | Arvidson | |
| 3,199,355 A | 8/1965 | Simon-Suisse | |
| 3,813,934 A | 6/1974 | Meyer | |
| 3,863,505 A | 2/1975 | Moffatt | |
| 4,102,209 A | 7/1978 | Brahm | |
| 4,922,745 A * | 5/1990 | Rudkin et al. | ............... 73/32 A |

FOREIGN PATENT DOCUMENTS

GB          1016915          1/1966

OTHER PUBLICATIONS

Geokon brochure, series 4500 transducers shown on pp. 8 and 9, Oct. 2003.
*Weston Vibrating Cylinder Pressure Sensor*, Weston Aerospace, Farnborough, UK, under product reference No. 7881 [illustrated in figure 5a of attached application and described on p. 2 of text].
PT4500 SERIES transducer; supplied by Geokon, Inc. of Lebanon, New Hampshire [illustrated in Fig. 6 of attached application and described on pp. 5 and 7 of text].

* cited by examiner

*Primary Examiner*—Andre J. Allen
(74) *Attorney, Agent, or Firm*—Nixon & Vanderhye P.C.

(57) ABSTRACT

A pressure measuring device (2) includes a vibrating ferromagnetic cylinder (4) and mechanically located within a casing (6). A diaphragm (24) is directly connected to the cylinder and forms a pressure measurement surface. Pressure on the diaphragm (24) results in a force and stresses in the cylinder (4) which change the resonant frequency of the vibrating cylinder.

26 Claims, 6 Drawing Sheets

Figure 3

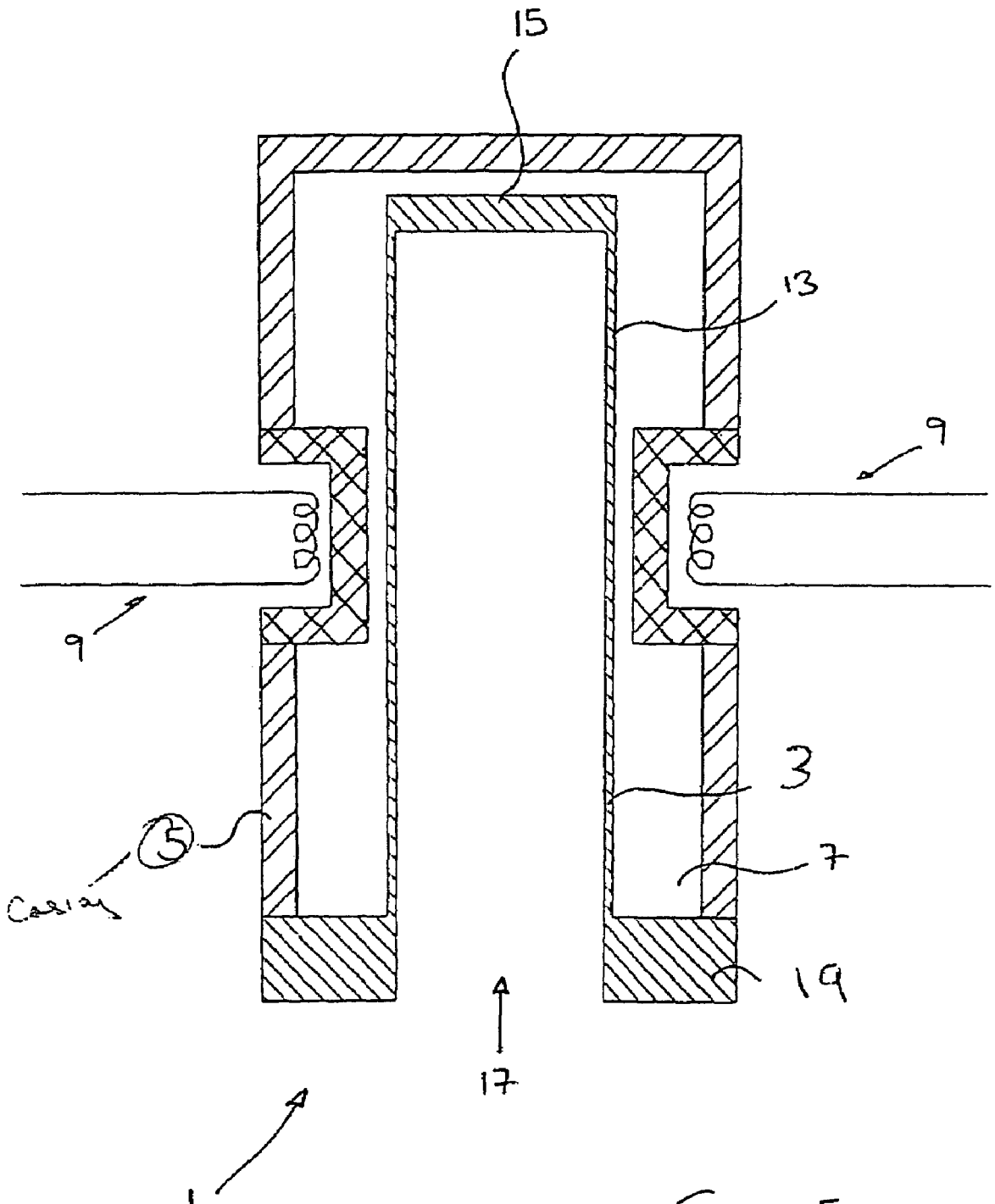

DEVICE FOR MEASURING PRESSURE

This invention relates to devices for measuring pressure.

It is known to use changes in frequency of vibration of mechanical components or systems to measure forces to which the components or systems are subject. For example, pressure measuring devices comprising a vibrating ferromagnetic component placed in contact with a pressurised fluid medium are known. The vibrating component may be excited by, for example, an electromagnetic drive coil, which causes resonance of the component. The application of pressure to a pressure sensitive surface of the vibrating component causes a stress field to be developed in the vibrating component. This stress field causes a stiffening of the component, which, in turn, causes a corresponding increase in its resonant frequency. A detection means generates a magnetic field with which it detects the movement of the ferromagnetic component as it vibrates. The vibrating component can be maintained in constant oscillation at its resonant frequency by a suitable amplifier that provides positive feedback by multiplying the signal from the detection means and applying it to the excitation means. The phase and gain of the amplifier are set so that the oscillations of the vibrating component are reinforced and become self-sustaining. A signal representing the movement of the component is generated and sent to a processing unit. The processing unit measures the frequency of the detected signal and, by referring to a model of the relationship of frequency to pressure, a measurement of fluid pressure may be derived.

An advantage of this system is that a change in applied force results directly in a change in resonant frequency. The stress field generated in the wall of the component by the applied force affects the resonant frequency directly. Although some strain is generated in the component, this has only a small effect on resonant frequency. The consequence of this is that the effects of creep on the component to which the force is applied are minimised. The component acts as the complete measurement system and it is only necessary to maintain it in resonance for frequency to be measurable.

A known vibrating cylinder device of the type described above is illustrated in FIG. 5a. This device is known as the "Weston Vibrating Cylinder Pressure Sensor" and is available from Weston Aerospace, Farnborough, UK under product reference number 7881. The device comprises a pressure measuring device 1 having a hollow cylinder 3 made from the nickel iron alloy Ni-Span-C 902® and is open to a pressurised fluid medium. The cylinder 3 is located within a casing 5. The cylinder 3 is rigidly attached to a cylinder support ring 19 that is rigidly and sealingly attached to the casing 5 to form a chamber 7. The cylinder side wall 13 and cylinder end wall 15 of the cylinder 3 are both spaced away from the casing 5, and define a cavity 17.

Arranged around the outside of the casing 5 are coil assemblies comprising electromagnetic drive coils 9 and pick-up coils (not shown). There are two drive and two pick-up coils, of the type shown in FIG. 5b. The coil assemblies 51 are equally spaced around the casing with drive and pick-up coils alternating. In use, each electromagnetic drive coil 9 generates a constant force on the side wall 13 of the cylinder. An alternating current in a wire coil 53 wrapped around a pole piece 57 modulates the field in the coil assembly 51 and the cylinder side wall 13. This generates an alternating force component on the cylinder side wall 13 where the force generated is related to the current in the wire coil 53 of the assembly 51. Meanwhile, each pick-up coil has a permanent magnet 55 which generates a constant field. The field forms a closed loop via a pole piece 57, a case 59 and the cylinder side wall 13. When the cylinder side wall 13 moves parallel to the axis of the pick-up coil, the magnetic field in the pole piece 57 is modulated, and generates a voltage in a wire coil 53 wound around the pole piece 57. The voltage generated is related to the velocity of the cylinder side wall 13 relative to the coil assembly 51. In this way, the pick-up coils are able to detect the movement of the ferromagnetic cylinder side wall 13 and send a signal representing this movement to a feedback amplifier to maintain the cylinder in resonance. The coupling efficiency of the pick-up coils is optimised by arranging the coils around the cylinder 3 opposite points of maximum nodal displacement.

In use, the chamber 7 is preferably evacuated. As pressurised fluid flows into the cavity 17, pressure is exerted on the cylinder side wall 13 and cylinder end wall 15. When the chamber 7 is evacuated and the cavity 17 is full of pressurised fluid, the pressure drop across the cylinder walls 13,15 is equal to the pressure of the fluid to be measured. The pressure exerted by the fluid on the cylinder side wall 13 and end wall 15 creates a tensile stress field with components parallel to the cylinder long axis and tangential to the cylinder circumference, and which causes the cylinder 3 to stiffen. As the cylinder 3 stiffens, the resonant frequency of the cylinder 3 increases. The pick-up coils detect the movement of the now stressed cylinder side wall 13 and send a signal to the processing unit. The frequency of the detected signal is then used to determine the pressure of the fluid via an empirical formula.

U.S. Pat. No. 3,021,711 discloses a device for measuring pressure in fluids. The device comprises a hollow bodied cylinder that is set into resonant oscillation. Taps are then opened to allow fluids of different pressures into the device either side of the cylinder wall. The change in resonant frequency of the cylinder may then be used to determine the difference between the pressure of the fluids.

U.S. Pat. No. 3,863,505 discloses a vibrating cylinder pressure transducer. This system allows the entry of pressurised fluid into one of either the vibrating cylinder itself, or the chamber surrounding the vibrating cylinder. A change in the resonant frequency of the vibrating cylinder indicates a change in the pressure of the fluid to be measured.

U.S. Pat. No. 4,102,209 discloses a temperature compensated vibrating cylinder pressure transducer. This system describes a vibrating cylinder pressure transducer inside the cylinder of which a pair of rings is fitted in order to reduce the effect of a decrease in reluctance of the cylinder walls at high temperature. This system allows the entry of pressurised fluid into one of either the vibrating cylinder itself, or the chamber surrounding the vibrating cylinder. A change in the resonant frequency of the vibrating cylinder indicates a change in the pressure of the fluid to be measured.

U.S. Pat. No. 3,199,355 provides a pressure transducer in which fluid is allowed to enter into at least one of either the vibrating cylinder itself, or the chamber surrounding the vibrating cylinder. A change in the resonant frequency of the vibrating cylinder indicates a change in the pressure of the fluid to be measured.

A problem of all the systems discussed above is that they are only accurate when used to detect the pressure of dry gases of constant composition. Mass distribution of fluid within the vibrating cylinder may cause unwanted measurement errors through damping of the oscillation, or through inertial effects of the fluid moving within the cylinder.

Unwanted measurement errors and/or noise may also occur if the composition of the pressure medium is not the same as the calibration gas.

GB 1,016,915 discloses a pressure transducer. The transducer comprises a hollow magnetic member which can be set to vibrate. The hollow magnetic member is inside a fluid-tight and fluid-filled chamber. A bellows is located on the outside of the device for placing in the medium whose pressure is to be determined. A rod then connects the bellows to a compensating member in the fluid-filled chamber such that the pressure in the medium in which the bellows is placed alters the pressure of the fluid in the fluid-tight chamber in which the vibratable magnetic member sits. Changes in pressure of the medium thereby affect the resonant frequency of the hollow magnetic member.

A problem with the pressure transducer of GB 1,016,915 is that errors can arise due to the complicated hydraulic mechanism for converting the force applied to the bellows by the medium whose pressure is being determined, into stresses in the hollow magnetic member.

A vibrating wire pressure transducer to measure subterranean pressure is also known. This transducer (a description of which may be found at http://www.inmtn.com/public/pdf/lit/Pt4500.pdf) is supplied by Geokon, Inc. of 48 Spencer Street, Lebanon, N.H. 03766, USA, as the PT4500 series and is illustrated in FIG. 6. The transducer 101 comprises a wire 103 within a sleeve or casing 105. The sleeve 105 is hermetically sealed at one end by a pressure-sensitive diaphragm 107 to form a chamber 109. The wire 103 is fastened at a first end to the diaphragm 107 by a first wire grip 111, and attached at its other end to the sleeve 105 by a second wire grip 111'. An electromagnetic coil 113 is located external to the sleeve 105. The coil 113 is designed so as to be able to electromagnetically pluck the wire 103 and detect the resulting motion.

In use, the chamber 109 is evacuated and the wire 103 is held in tension. As pressure is applied to the diaphragm 107, it flexes. This causes a shortening of the wire 105 and a corresponding reduction in the tension under which it is held. Consequently, as pressure applied to the diaphragm increases, the wire 103 shortens, and the resonant frequency of the wire falls. The coil 113 plucks the wire 103 and detects the subsequent movement. A movement signal is then generated and fed to a processing unit (not shown) that determines its frequency. The frequency of the movement signal is then compared to the resonant frequency of the wire 103 in an unpressurised state. From this comparison, a value of subterranean pressure can be determined.

The vibrating wire transducer of Geokon, Inc. has a number of problems.

The need for pre-tensioning makes the sensor prone to errors. In order to measure applied forces (which are compressive), the wire 103 must be pre-tensioned. The Geokon system can only directly measure tension or changes in tension of the wire. The need for pre-tensioning means the Geokon device is relatively complicated to make and to calibrate accurately.

In order to pre-tension the wire, the supporting structure (including the diaphragm) must be stiff enough to resist deflection as the wire is tensioned. This stiffness will manifest itself in parallel with the stiffness of the wire. Consequently, the supporting structure will carry a significant proportion of any load applied to the diaphragm. This means that the wire 103 will act more as a strain gauge than a force sensor. The pressure measurement is therefore particularly subject to errors resulting from creep in the wire which is under permanent tension, and also to slip of the grips by which the wire is held.

The Geokon vibrating wire system is also inefficient. The vibrational mode shape of a wire does not have axial symmetry and so significant energy losses occur as a wire vibrates. Consequently, in order that the wire may maintain its vibrational mode shape, energy at least equal to this significant loss of energy must be supplied. A further consequence of this lack of symmetry is that the quality factor (Q-Factor) of the transducer will be low. This means that for a short period of excitation, a wide range of frequencies is excited which takes a short time to decay. Another consequence is that it is easier for external vibration to influence the oscillation of the wire.

The Geokon transducer is also limited to measuring pressures that are less than the amount by which the wire is pre-tensioned. Any pressure greater than the pre-tension will cause the wire to go slack. When the wire is slack, it is not possible to cause the wire to resonate.

The present invention provides a device for measuring pressure as defined in independent claims 1 and 25 to which reference should now be made.

An advantage of preferred embodiments of the invention are that, since the cavity defined by the inner wall of the shell is inside a sealed chamber, its wall is not in contact with the medium within which the device sits. The device is therefore suitable for use in both liquid and gas pressure measurement.

A further advantage of preferred embodiments of the invention is the direct mechanical transfer of the forces arising from the pressure being monitored into stresses in the vibrating element. This significantly reduces errors.

A further advantage of preferred embodiments of the invention is that the shell of the device is able to withstand both tensile and compressive forces without pre-tensioning. The only limitation on the compressive force that may be measured by the device is the buckling load of the shell. Furthermore, since no components are under permanent load, creep effects are minimised.

Preferred features of the invention are defined in the dependant claims to which reference should now be made.

Preferably, the shell takes the form of a hollow body, for example, a cylinder. In this case, the rotational symmetry of the cylinder, and its vibration mode shape (in the case where an even number of nodes are generated), make the device inherently well balanced. The sensor is less sensitive to external vibration and energy losses from the vibrating cylinder are reduced. This reduction in energy loss improves the frequency response of the cylinder and hence its frequency stability.

Preferred embodiments of the present invention will now be described by way of example only, and with reference to the accompanying figures. The figures are only for the purposes of illustrating one or more preferred embodiments of the invention and are not to be construed as unifying the invention or limiting the appendant claims. The skilled man will readily and easily envisage alternative embodiments of the invention in its various aspects.

FIG. 3 is a view similar to FIG. 1 of an alternative embodiment of the present invention;

FIGS. 5a and 5b illustrate a prior art device for measuring fluid pressure; and

Figure 1:
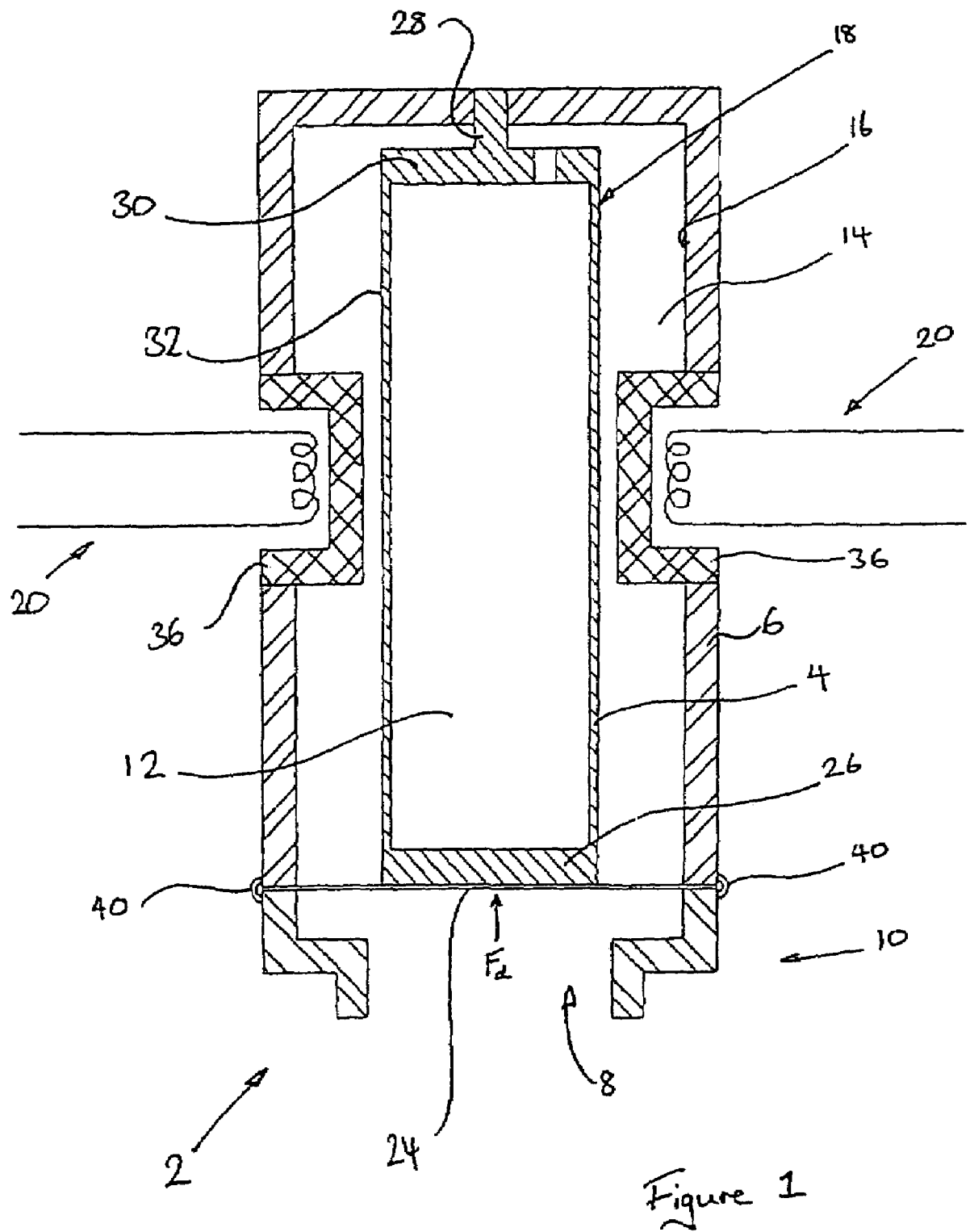
FIG. 1 illustrates in longitudinal section a pressure measuring device embodying the invention.

Referring to FIG. 1, a device 2 for measuring fluid pressure comprises a ferromagnetic cylinder 4 located within a casing 6. The casing 6 is formed with an opening 8 at a first end 10. The cylinder 4 is thin-walled, hollow and defines an inner cylindrical chamber 12. The cylinder 4 is mostly made of a ferromagnetic material with a low thermoelastic coefficient in order to minimise the variation of its resonant frequency with temperature. A suitable material for the cylinder 4 would be a Nickel-Iron alloy such as Ni-Span-C 902® of Special Metals Corporation (USA) or any other ferromagnetic material whose Young's Modulus is resistant to changes with temperature (such as Elinvar™). All components of the device 2 other than the drive and pick-up coils 20 (see below) and the panels 36 may be made of the same material to minimise the generation of unwanted forces due to the mismatch of thermal expansion coefficients. The panels 36 are made of non-ferromagnetic material. A second or outer chamber 14 is formed between the inner wall 16 of the casing 6 and the outer wall 18 of the cylinder 4.

Figure 5B:
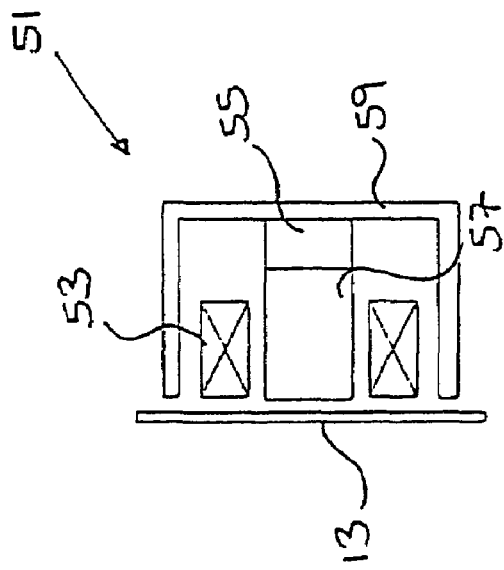
Figure 6:
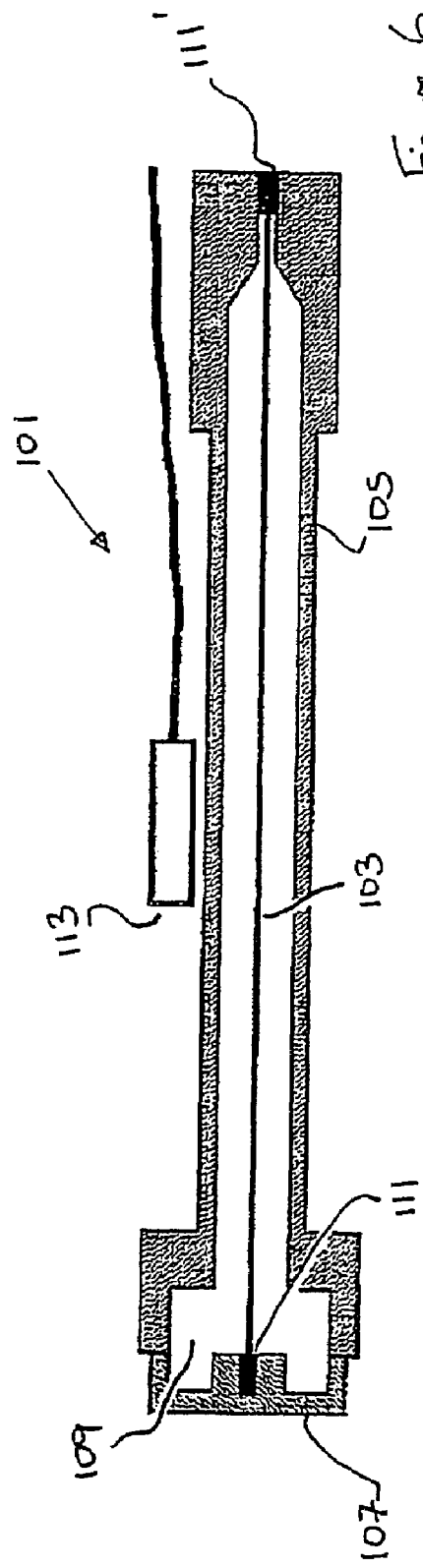
FIG. 6 illustrates a second prior art device for measuring subterranean pressure.

Electromagnetic coils 20 for exciting movement of the cylinder 4 and electromagnetic coils 22 for detecting movement of the cylinder 4 are located around the exterior of the casing 6. The electromagnetic excitation and pick-up coils are of the type used in the known device shown in FIG. 5b and described above. The excitation coils 20 and detection coils 22 could be replaced by any excitation or detection system: For example, electrostatic and/or optical systems are also suitable. In order to optimise coupling, the electromagnetic coils 20,22 are arranged around the exterior of the casing 6 in a rotationally symmetric manner with respect to the cross-section of the cylinder 4 (see FIG. 2).

A diaphragm 24 (also of Ni-Span-C 902®, although any elastic material could be used with little impact on the resonant frequency of the cylinder through mismatching of thermal expansion coefficients) to which a force to be measured is applied is formed adjacent a first end wall 26 of the cylinder 4 at the first end 10 of the casing 6. In FIG. 1, the diaphragm is held in place with respect to the casing 6 by sandwiching the edges of the diaphragm between two portions of the casing 6. There is a weld 40 welding the diaphragm 24 to the casing 6. The diaphragm 24 is thin compared to the thickness of the casing 6. The diaphragm 24 applies the force to be measured to a first end wall 26 of the cylinder 4. The diaphragm 24 and casing 6 in combination also seal the second or outer chamber 14.

A stub 28 spaces a second end wall 30 of the cylinder 4 from the interior wall 16 of the casing 6. In this arrangement, the application of a force or a pressure to the diaphragm 24 will transfer a force to the first cylinder end wall 26. Since the stub 28 resists movement of the cylinder 4, a compressive stress field will be generated in the cylinder side wall 32.

Panels or magnetic window elements 36, transparent to magnetic fields, are located in the wall of the casing 6 between the coils 20,22 and the cylinder 4. A suitable material for the panels 36 is austenitic (non-ferromagnetic) stainless steel. The panels 36 allow the coils 20,22 to easily cause and detect the movement of the cylinder 4. Without the panels 36, the casing 6 would absorb the field generated by the drive coils 9, and the movement of the cylinder side wall 32 would be masked to the pick-up coils. The panels 36 are sealingly attached to the casing 6 to prevent the transfer of air through the wall of the casing 6.

The cylindrical chamber 12 and the outer chamber 14 are both evacuated and the pressures within each are kept the same, in a vacuum. The vacuum formed within the chambers 12,14 acts as a pressure measurement reference and also serves to eliminate viscous damping of vibration of the cylinder side wall 32. The formation of a vacuum also helps to enhance the quality factor (Q-Factor) of the transducer i.e. for a short period of excitation, a narrow range of frequencies is excited which takes a long time to decay.

Figure 2:
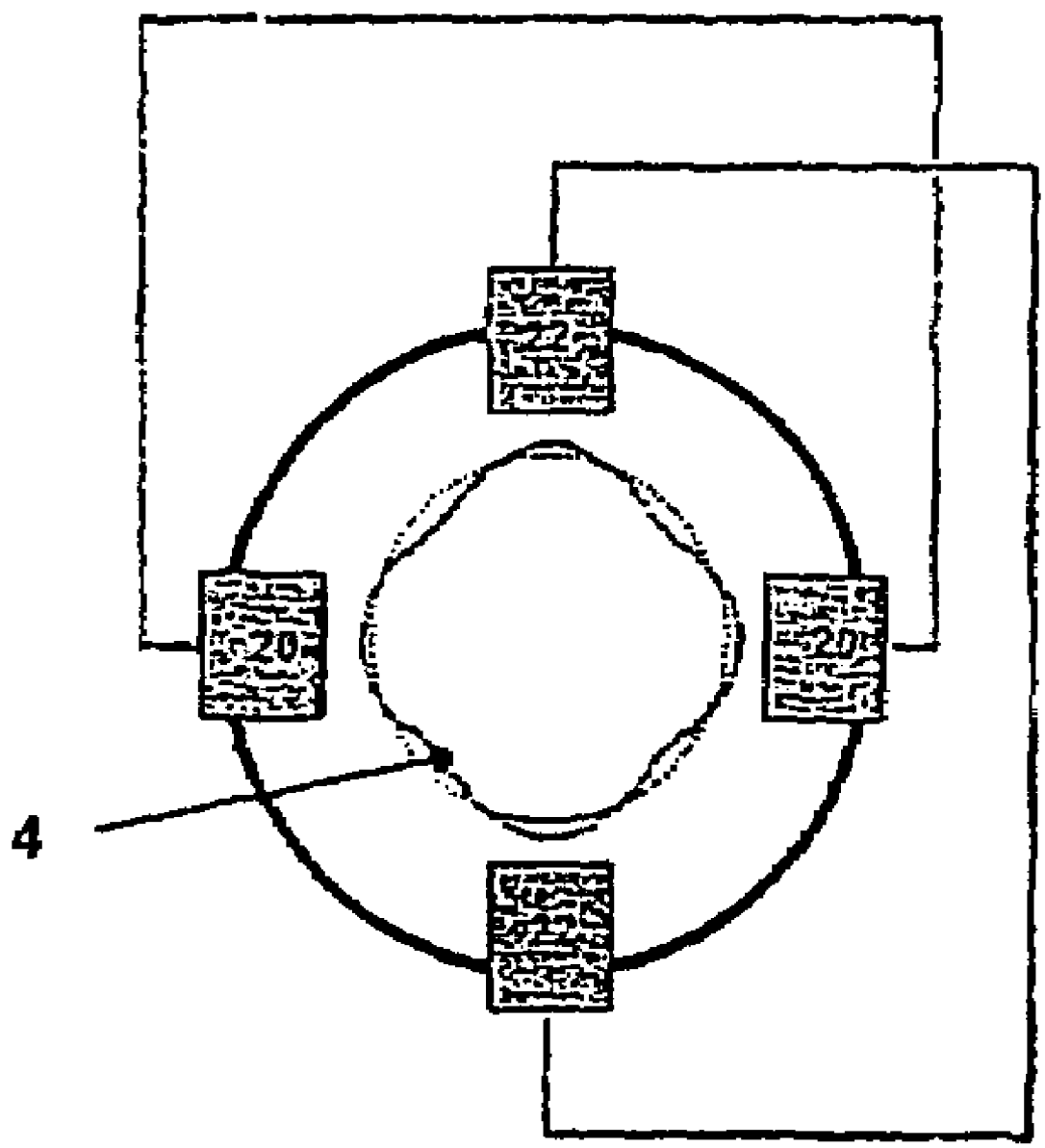
FIG. 2 illustrates, diagrammatically, a cross-section across the line A-A of the cylinder of FIG. 1, and the associated drive and pick-up coils.

The side wall 32 of the cylinder 4 may be made to resonate in a hoop mode resonance when excited by the excitation coils 20. This occurs by passing a current through the excitation coils 20 to create a magnetic field. As the cylinder 4 is made from a ferromagnetic material, the interaction of the magnetic field with the cylinder side wall 32 causes it to vibrate at its resonant frequency. FIG. 2 represents the resonance of the cylinder side wall 32 in a particular resonant mode having eight nodes. Other modes may also be used in force measurement. The number of excitation coils in operation, and their arrangement around the casing 4, in part determines the number of nodes of oscillation.

The detection coils 22 detect the movement of the cylinder side wall 32 and generate a movement signal. The movement signal is fed to a processing means (not shown) which determines the frequency at which the cylinder side wall 32 is vibrating. The processing means then compares the measured frequency to a model of the frequency response of the cylinder 4 at different loads and hence determines pressure applied to the diaphragm 24. For optimum coupling to the desired mode of oscillation, the detection coils 22 should be located opposite a point of maximum oscillatory displacement i.e. opposite one of the vibrational anti-nodes.

In use, pressure is applied to the diaphragm 24 by, for example, placing the device within a fluid (e.g. a gas such as air, or a liquid such as oil). The fluid is in contact with diaphragm 24. The fluid pressure applied to the diaphragm causes a compressive stress in the cylinder side wall 32. As the cylinder 4 is held in place by the stub or fixing 28, and no fluid enters the cylinder 4, only axial force is applied to the cylinder side wall 32.

The application of a compressive force to the cylinder side wall 32 causes the stiffness of the side wall 32 to decrease. This reduction in the stiffness of the cylinder side wall 32 results in a decrease in the resonant frequency. The force applied to the cylinder side wall 32 by the diaphragm 24 is determined as follows:

$$F_c = \frac{F_d}{\frac{K_d}{K_c} + 1}$$

where $F_c$=axial force applied to the cylinder side wall 32 (where the axis referred to is the longitudinal axis of the cylinder)

$F_d$=axial force applied to the diaphragm 24

$K_d$=axial stiffness of the diaphragm 24

$K_c$=axial stiffness of the cylinder 4 and, when a pressure is applied to the diaphragm 24, $F_d = PA_e$ where P=pressure applied to the diaphragm 24

$A_e$=effective area of the diaphragm 24

The effective area $A_e$ is greater than the cross-sectional area of the first end of the cylinder 26 adjacent the diaphragm 24, but less than the total area of the diaphragm 24.

For optimal force transfer to the cylinder wall 32, the stiffness of the cylinder 4 ($K_c$) should be significantly greater than the stiffness of the diaphragm 24 ($K_d$). In this way, the force applied to the cylinder wall ($F_c$) tends to the force applied to the diaphragm ($F_d$), and the stiffness of the diaphragm 24 has very little influence on the force generated in the cylinder side wall 32 by the force applied to the diaphragm 24. Consequently, the force measured will be robust to creep losses and hysteresis.

An approximate relationship between frequency and force is then determined by the following equation:

$$f=f_0(1-k'F_d)^{1/2}$$

where $f_0$=frequency when no force is applied to the diaphragm 24

$F_d$=axial force applied to the diaphragm 24 and, when a pressure is applied to the diaphragm 24, $F_d=PA_e$ where P=pressure applied to the diaphragm 24

$A_e$=effective area of the diaphragm 24 k'=a constant with positive value

A temperature sensor (not shown) may be provided within the device 2. The temperature sensor provides a means for temperature compensation of the pressure measurement.

Figure 3:
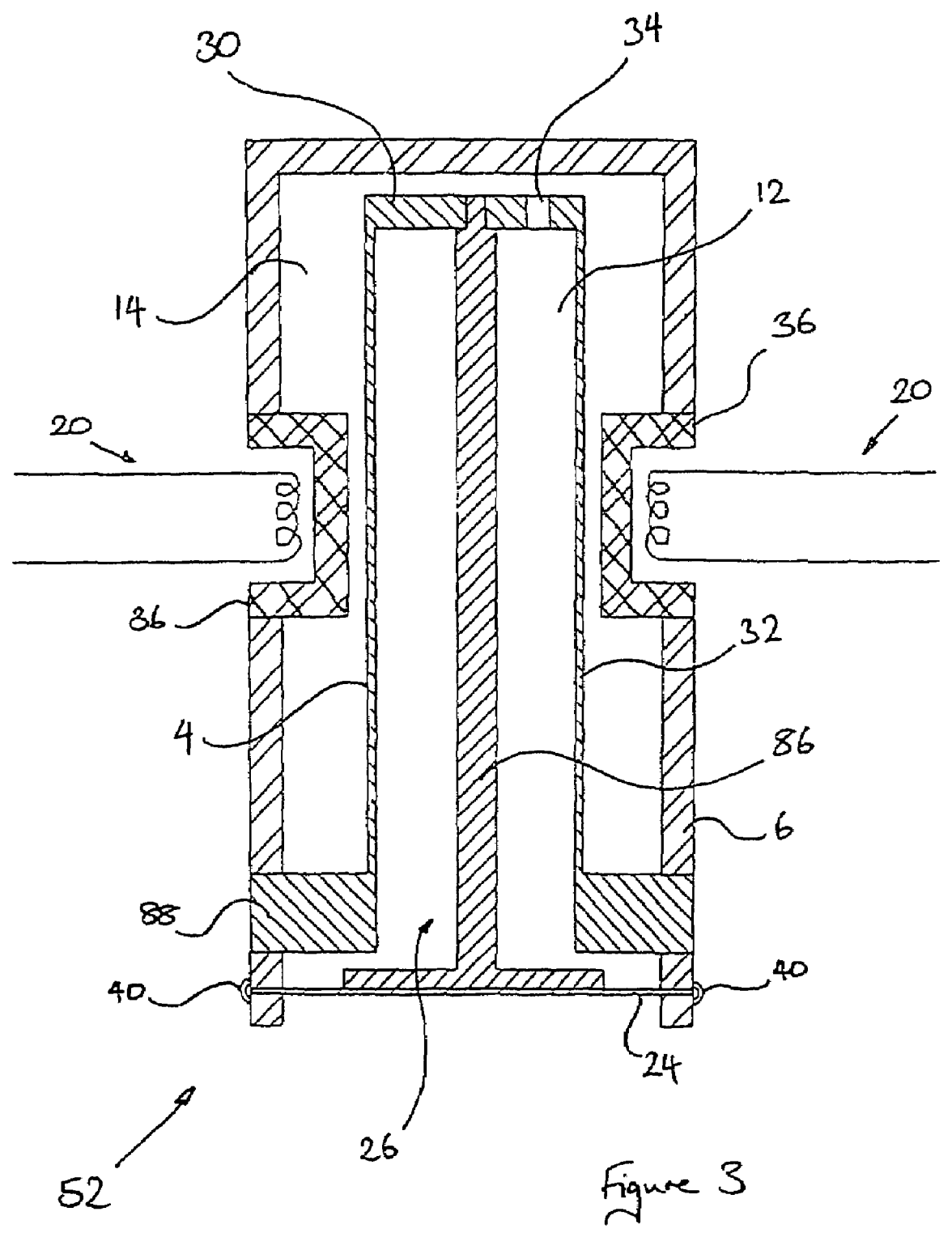

In a second embodiment, illustrated in FIG. 3, an alternative device 52 for measuring pressure is provided. The construction of this device is the same as that for the device of FIGS. 1 and 2 except for the means for transferring an applied load on the diaphragm into stresses in the cylinder side wall 32. FIG. 3 uses the same reference numerals used in FIG. 1 for equivalent components. In the embodiment of FIG. 3, a rigid shaft 86 is provided, adjacent the diaphragm 24. The shaft 86 is attached to the diaphragm 24 by, for example, spot welding. The shaft 86 extends from the diaphragm 24, along the cylinder centre axis, through an opening at a first end 26 of the cylinder 4 near the diaphragm 24, to a cylinder end wall 30. The cylinder 4 of this device 52 is rigidly attached at the first end to a cylinder support ring 88. The ring 88 is rigidly attached to the casing 6. A passage 34 between the inner chamber 12 and the outer chamber 14 is located in the cylinder end wall 30. In an alternative embodiment, the passage could be provided in the cylinder support ring 88.

With this arrangement, a force applied to the diaphragm 24 will be transferred to the shaft 86. The shaft, being of stiff material, exerts a force on the cylinder end wall 30 which creates tensile stresses in the cylinder side wall 32. As the cylinder side wall 32 is stretched, it becomes stiffer. This stiffening of the cylinder side wall 32 causes the resonant frequency to increase. This increase in frequency is therefore directly attributable to the force (and hence pressure) applied to the diaphragm 24. With this arrangement, the likelihood of cylinder collapse is eliminated, and higher forces, in excess of the measurement range, can be accommodated without damaging the device.

Figure 4:
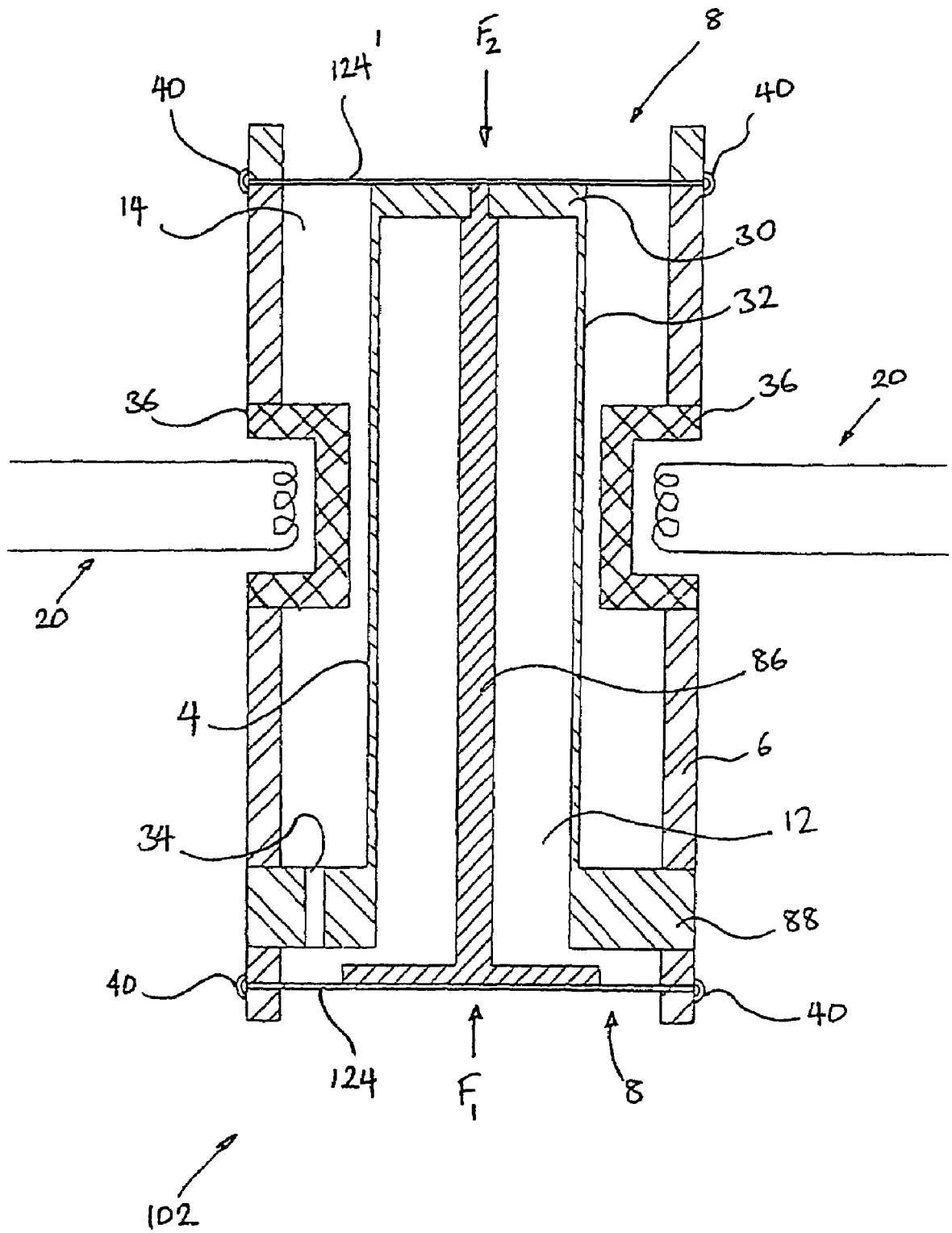
FIG. 4 is a view similar to FIGS. 1 and 3 of a further alternative embodiment of the present invention.

In another embodiment, illustrated in FIG. 4, a device 102 for measuring the difference between two forces or pressures is provided. The construction of this device is similar to those of FIGS. 1 and 3 described above and, where appropriate, the same reference numerals will be used. In this embodiment, the casing has openings at opposite ends so that it takes the form of a tube. At the first end, a first diaphragm 124 is provided for transferring a first force $F_1$ applied to the diaphragm 124 to the cylinder side wall 32, via the shaft 86, as a tensile force. The shaft 86 is attached to the first diaphragm 124 and extends from the first diaphragm 124 to the inner surface of the end wall of the cylinder 30 at the second end of the cylinder and casing. At the second end, a diaphragm 124' is provided for transferring a second force $F_2$ applied to the diaphragm 124' to the cylinder side wall 32 as a compressive force. Alternatively, the diaphragm could be provided adjacent the outer surface of the cylinder end wall 30 at the second end, adjacent a second rigid shaft (not shown) attached to the second diaphragm 124' which extends from the diaphragm 124' towards the outer surface of the cylinder end wall 30.

The diaphragms 124,124' have the same effective area so that the force generated in the cylinder side wall 32 is zero when the forces applied to each diaphragm 124,124' are equal and opposite. A passage 34 between the inner chamber 12 and the outer chamber 14 is located in a cylinder support ring 88.

In this arrangement, the combined axial force generated by the diaphragms 124,124' is given by the following equation:

$$F_d=F_1-F_2$$

where $F_1$=magnitude of the force applied to diaphragm 124

$F_2$=magnitude of the force applied to diaphragm 124' and, when pressures are applied to the diaphragms 124 and 124'

$F_1=A_eP_1$ and $F_2=A_eP_2$ where $P_1$=magnitude of the pressure applied across diaphragm 124

$P_2$=magnitude of the pressure applied across diaphragm 124'

$A_e$=effective area of diaphragms 124,124'

The force applied to the cylinder wall 32 depends on the relative stiffness of the diaphragms 124,124' and the cylinder 4 and is determined by the following equation:

$$F_c = \frac{F_d}{\frac{K'_d}{K_c}+1}$$

where $K'_d$=the sum of the stiffnesses of diaphragms 124 and 124'.

Optimal force transfer to the cylinder wall 132 will occur if $K_c$ is significantly greater than $K'_d$ as $F_c$ then tends to $F_d$.

The approximate relationship between frequency and differential pressure is given by:

$$f=f_0(1+k''A_e(P_1-P_2))^{1/2}$$

where k" is a constant with a positive value.

The invention claimed is:

1. A device for measuring or monitoring the pressure in a medium or differences in pressure between two media, by monitoring changes in the resonant frequency of a vibrating stress member coupled to a surface in the medium or media, or surfaces in the media, wherein the device comprises:

a housing defining a first sealed chamber, the housing having at least one wall, and at least one measurement surface for placing in the medium or media;

said vibrating stress member comprising a shell located inside the chamber; and means for mechanically converting the force resulting from the pressure of the medium in which the measurement surface is placed into a stress in the stress member.

2. A device according to claim 1 wherein the first sealed chamber is in vacuo.

3. A device according to claim 1 wherein a measurement surface is rigidly connected to the stress member such that a force on the measurement surface is directly transmitted to the stress member and gives rise to stress in the stress member.

4. A device for measuring or monitoring the pressure in a medium or differences in pressure between two media, by monitoring changes in the resonant frequency of a vibrating stress member coupled to a surface in the medium or media, or surfaces in the media, wherein the device comprises a housing defining a first sealed chamber, the housing having at least one wall, and at least one measurement surface for placing in the medium or media, the stress member being a shell inside the chamber and the device including means for mechanically converting the force resulting from the pressure of the medium in which the measurement surface is placed into a stress in the stress member, wherein a measurement surface is immediately adjacent the stress member such that a force on the measurement surface results directly in a stress in the stress member.

5. A device according to claim 1 wherein the shell is a shell of rotation.

6. A device according to claim 5 wherein the shell is a cylinder.

7. A device according to claim 5 wherein a first portion of the shell proximal to a measurement surface is coupled to the measurement surface such that a force applied to the measurement surface in a direction towards the shell results in a compressive force being applied to the shell, and a force applied to the measurement surface in a direction away from the shell results in a tensile force being applied to the shell.

8. A device according to claim 7 wherein a second portion of the shell distal to the measurement surface is fixed relative to a chamber wall distal to the measurement surface.

9. A device according to claim 8 wherein the second portion of the shell is fixed relative to the chamber wall by a force resistant member.

10. A device according to claim 9 wherein the force resistant member comprises a stub.

11. A device according to claim 9 wherein the force resistant member comprises a cage.

12. A device according to claim 5 wherein the first portion of the shell is welded to the measurement surface.

13. A device according to claim 1 wherein a first portion of the shell distal to the measurement surface is coupled to the measurement surface such that a force applied to the measurement surface in a direction towards the shell results in a tensile force being applied to the shell, and a force applied to the first measurement surface in a direction away from the shell results in a compressive force being applied to the shell.

14. A device according to claim 13 wherein a second portion of the shell proximal to the measurement surface is fixed relative to a wall of the housing.

15. A device according to claim 13 wherein the first portion of the shell distal to the measurement surface is coupled to the measurement surface by a force bearing element.

16. A device according to claim 15 wherein the force bearing element is welded to the measurement surface.

17. A device according to claim 13 wherein the housing further comprises a second measurement surface, coupled to the first portion of the shell distal to the first measurement surface, such that a force applied to the second measurement surface in a direction towards the shell, results in a compressive force being applied to the shell, and a force applied to the second measurement surface in a direction away from the shell results in a tensile force being applied to the shell.

18. A device according to claim 17 wherein the second measurement surface is welded to the first portion of the shell.

19. A device according to claim 1 wherein the measurement surface is a flexible diaphragm.

20. A device according to claim 1 wherein the shell defines a second chamber inside the first chamber.

21. A device according to claim 20 wherein the first and second chambers are at the same pressure.

22. A device according to claim 21 wherein the first and second chambers are in vacuo.

23. A device according to claim 21 wherein the first and second chambers are connected by a passage in the shell.

24. A device according to claim 23 wherein the shell is a cylinder and the passage is in an end wall of the cylinder.

25. A device for measuring or monitoring the pressure in a medium or differences in pressure between two media, by monitoring changes in the resonant frequency of a vibrating stress member coupled to a surface in the medium or media, or surfaces in the media, wherein the device comprises a housing defining a first sealed chamber, the housing having at least one wall, and at least one measurement surface for placing in the medium or media, the stress member being a shell defining a second chamber within the first sealed chamber, and the device including means for mechanically converting the force resulting from the pressure of the medium in which the measurement surface is placed into a stress in the stress member, wherein the measurement surface is a flexible diaphragm immediately adjacent the stress member and the first and second chambers are connected by a passage in the shell.

26. A device according to claim 25, wherein the first and second chambers are in vacuo.

* * * * *